United States Patent
Drescher et al.

(10) Patent No.: US 10,878,554 B2
(45) Date of Patent: Dec. 29, 2020

(54) DEFECT DETECTION AND MEASUREMENT METHOD

(71) Applicant: United Technologies Corporation, Farmington, CT (US)

(72) Inventors: Joseph D. Drescher, Middletown, CT (US); Kenneth A. Frisk, West Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 556 days.

(21) Appl. No.: 15/794,393

(22) Filed: Oct. 26, 2017

(65) Prior Publication Data

US 2019/0130557 A1 May 2, 2019

(51) Int. Cl.
| | |
|---|---|
| *G06T 7/00* | (2017.01) |
| *G01N 19/08* | (2006.01) |
| *G01B 21/20* | (2006.01) |
| *G01B 11/24* | (2006.01) |
| *G01B 5/20* | (2006.01) |
| *G06T 7/41* | (2017.01) |
| *G06F 17/13* | (2006.01) |
| *G06F 17/18* | (2006.01) |
| *G06T 7/35* | (2017.01) |

(52) U.S. Cl.
CPC ............. *G06T 7/0006* (2013.01); *G01B 5/20* (2013.01); *G01B 11/24* (2013.01); *G01B 21/20* (2013.01); *G01N 19/08* (2013.01); *G06F 17/13* (2013.01); *G06F 17/18* (2013.01); *G06T 7/001* (2013.01); *G06T 7/41* (2017.01); *G06T 7/35* (2017.01)

(58) Field of Classification Search
CPC ................................ G06F 17/13; G06F 17/18
See application file for complete search history.

(56) References Cited

U.S. PATENT DOCUMENTS

| | | | |
|---|---|---|---|
| 5,345,514 | A | 9/1994 | Mandavieh et al. |
| 5,371,462 | A | 12/1994 | Hedengren et al. |
| 5,781,007 | A | 7/1998 | Partika et al. |
| 6,608,478 | B1 | 8/2003 | Dziech et al. |
| 6,972,561 | B2 | 12/2005 | Fields et al. |
| 7,019,537 | B2 | 3/2006 | Hazel et al. |
| 7,302,851 | B2 | 12/2007 | Czerw et al. |

(Continued)

FOREIGN PATENT DOCUMENTS

WO    WO 2013015013 A1    1/2013

OTHER PUBLICATIONS

Extended European Search Report for European Patent Application No. 18202918.1 dated Jan. 11, 2019, 9 pages.

*Primary Examiner* — Gregory J Toatley, Jr.
*Assistant Examiner* — Terence E Stifter, Jr.
(74) *Attorney, Agent, or Firm* — Kinney & Lange, P. A.

(57) ABSTRACT

A method of evaluating an article includes measuring a feature of the article using a defect detection device. A set of data points is recorded representing the first feature and the set of data points is analyzed. The analyzing includes constructing a filtered curve by constructing a raw curve by listing the set of data points, constructing a first meanline curve, and finding a first difference between the raw curve and the first meanline curve. The analyzing also includes constructing a reversal curve by calculating a second derivative of a meanline curve constructed from the set of data points. The method also includes deciding the acceptability of the feature of the article.

19 Claims, 5 Drawing Sheets

(56) References Cited

U.S. PATENT DOCUMENTS

| | | |
|---|---|---|
| 8,493,064 B2 | 7/2013 | Setbacken et al. |
| 2006/0017434 A1 | 1/2006 | Tenley et al. |
| 2008/0024778 A1* | 1/2008 | Honda .................. G01N 21/359 356/303 |
| 2011/0184695 A1* | 7/2011 | Grzesiak .................. G01B 5/20 702/167 |
| 2015/0308813 A1* | 10/2015 | Morrissey .............. G01B 11/24 356/612 |
| 2017/0227356 A1 | 8/2017 | Saito et al. |

* cited by examiner

DEFECT DETECTION AND MEASUREMENT METHOD

BACKGROUND

Manufactured components for machinery are traditionally inspected in order to ensure that they are made substantially in accordance with their nominal specifications. Any differences can be due to imprecisions in manufacturing techniques such as worn cutting tools, fixture movement, thermal growth or shrinkage, among other things. A part may have several different specifications to ensure proper fitment, wear-in, longevity, etc. Therefore, a workpiece that becomes the part can be measured in different ways for these and other properties at various stages of manufacturing. For example, the workpiece can be measured using dimensional metrology to make sure that the macro-level features are the correct shape and size, and the workpiece can also be measured using non-destructive evaluation to make sure that the nano-level surface finish is appropriate.

Due to the accuracy and precision desired for inspection, different equipment and techniques can be used to measure macro-level features than are used to measure nano-level features. Furthermore, there can be micro-level features that are difficult to differentiate from the macro-level and/or nano-level features. Such micro-level features can include defects which can be important to identify as they can affect the suitability and/or the life-span of the part.

SUMMARY

According to one embodiment of the present disclosure, a method of evaluating an article includes measuring a feature of the article using a defect detection device. A set of data points is recorded representing the first feature and the set of data points is analyzed. The analyzing includes constructing a filtered curve by constructing a raw curve by listing the set of data points, constructing a first meanline curve, and finding a first difference between the raw curve and the first meanline curve. The analyzing also includes constructing a reversal curve by calculating a second derivative of a meanline curve constructed from the set of data points. The method also includes deciding the acceptability of the feature of the article.

DETAILED DESCRIPTION

Figure 1:
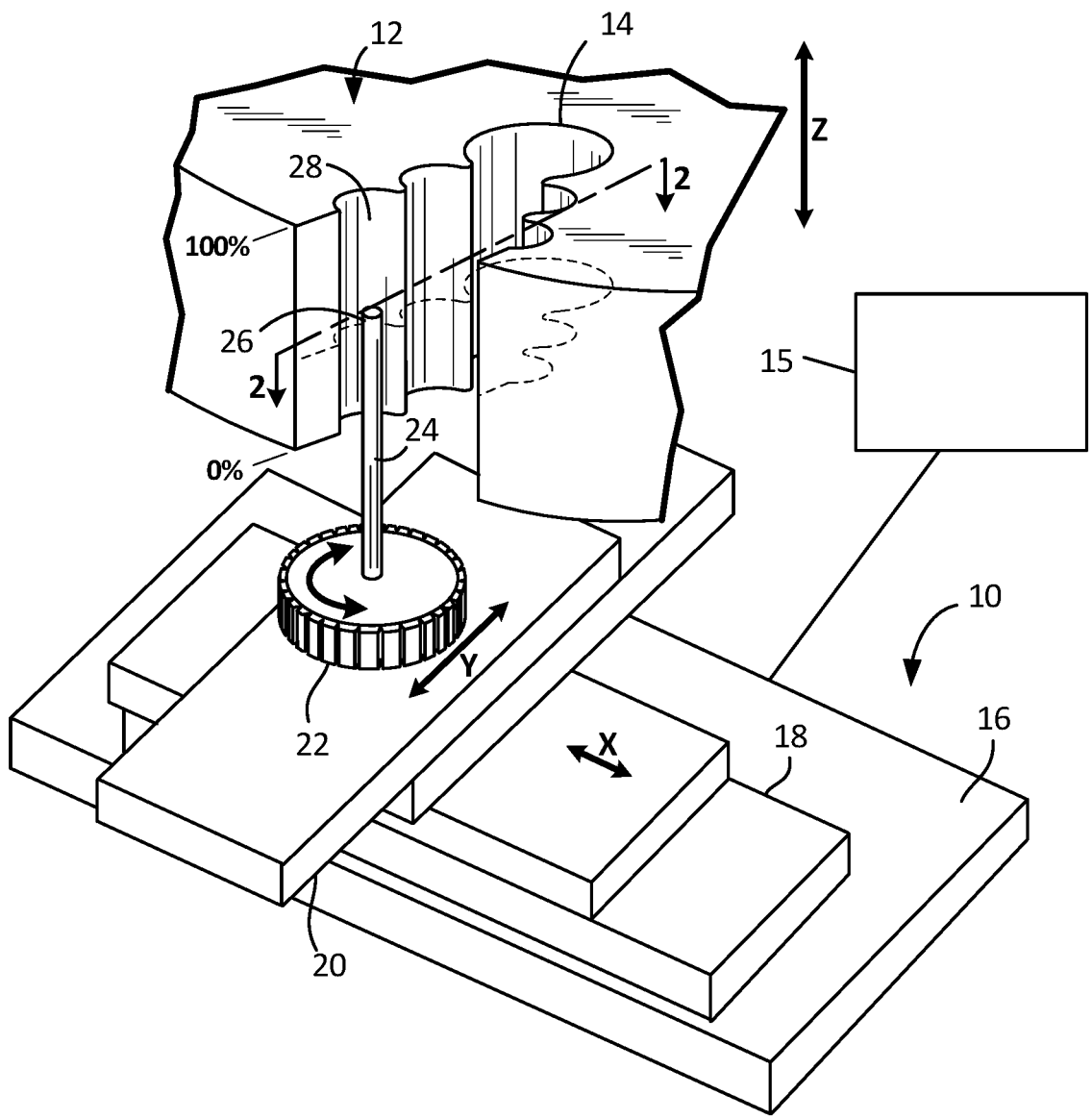
FIG. 1 is a perspective view of a defect detection system and a workpiece.

FIG. 1 is a perspective view of defect detection system 10 and workpiece 12. In the illustrated embodiment, workpiece 12 is an article that is in the manufacturing process, for example, to become a rotor disk (not shown). Workpiece 12 includes a plurality of circumferentially spaced dovetail slots 14 (although only one is visible in FIG. 1) that are each configured to receive a rotor blade (not shown). Defect detection system 10 comprises controller 15, base 16, X-table 18, Y-table 20, rotary table 22, probe 24, and tip 26. Controller 15 controls the movements of defect detection system 10 and records and analyzes measurements therefrom. Base 16 is configured to be movable parallel to the Z-axis with respect to workpiece 12. X-table 18 is slidably connected to base 16 and can move parallel to the X-axis. Y-table 20 is slidably connected to X-table 18 and can move parallel to the Y-axis. Rotary table 22 is rotatably connected to Y-table 20 and can rotate in the XY plane, parallel to the Z-axis. In alternate embodiments, other configurations of defect detection system 10 are possible that provide the required degrees of freedom for the measurement of workpiece 12.

Probe 24 is connected to rotary table 22 and includes tip 26 for measuring dovetail slots 14. Probe 24 can be a pointed stylus that contacts workpiece 12 or probe 24 can be an optical (e.g., confocal) or laser system that measures photons that are reflected off of workpiece 12 (that can be sent by tip 26 or are present in the ambient environment). In order to measure dovetail slot 14, defect detection system 10 moves tip 26 in the X and Y directions along the inside of dovetail slot 14 at a constant Z position. In addition, probe 24 is rotated so that tip 26 remains normal to the local surface of dovetail slot 14 that is being measured at any given time. In one embodiment, a full measurement of dovetail slot 14 includes three parallel passes along different regions of dovetail slot 14—one at 20% height, one at 50% height (as denoted by the phantom line), and one at 80% height. In this manner, a surface feature, such as defect 28, can be detected even if it does not extend fully from 0% height to 100% height.

Figure 2:
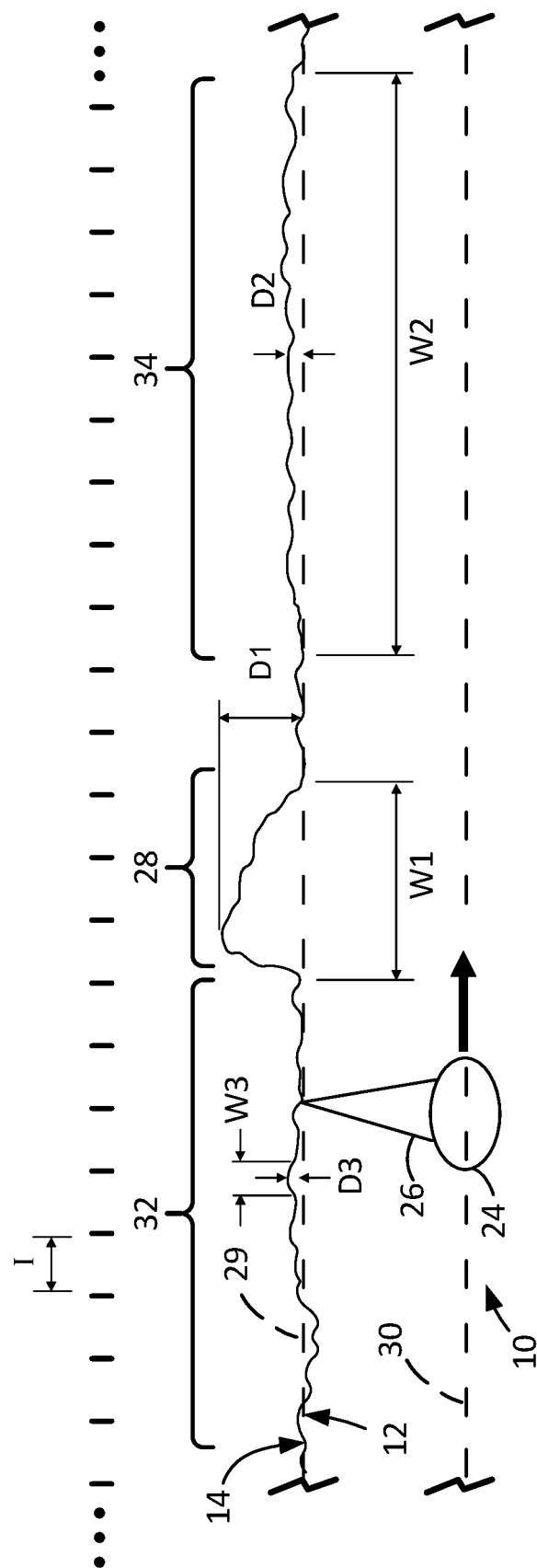
FIG. 2 is a cross-sectional view of an enlarged surface of the workpiece along line 2-2 in FIG. 1.

In order to better illustrate the surface features that can be encountered by defect detection system 10, FIG. 2 is a cross-sectional view of an enlarged surface of workpiece 12 along line 2-2 of FIG. 1. The depiction in FIG. 2 is not drawn to scale, although some of the sizes of the features therein will be specified below.

In the illustrated embodiment, nominal line 29 represents the shape of the local region of the design for the part that workpiece 12 will become. Nominal line 29 serves as a reference from which defect detection system 10 measures workpiece 12. Pathway 30 is offset from nominal line 29, away from workpiece 12, and is the path that probe 24 follows as dovetail slot 14 is measured. As tip 26 is moved along the surface of workpiece 12 (as depicted in FIG. 2, in the direction of right to left), there are multiple properties can be measured by controller 15 (shown in FIG. 1). For example, the amount of movement required to keep tip 26 in contact with (e.g., for a tactile tip 26) or a specified distance away from the surface (e.g., for an optical or laser tip 26) can be measured, or the changing force (e.g., from a force-loaded tactile probe 24) or changing light signal (e.g., for an optical or laser tip 26) can be measured. During inspection, tip 26 can be moved along workpiece 12 at a relatively constant rate, and measurements can be taken at either time or displacement increments. This results in a data set with data points that geometrically separated by interval I.

Shown in FIG. 2, on the surface of workpiece 12, are three types of features that can be encountered by probe 24: defect 28, surface roughness 32, and deviation 34. Defect 28 is what defect detection system 10 is configured to find, measure, and analyze. In the illustrated embodiment, defect 28 is a micro-level feature that has depth $D_1$ on the order of 3.8 μm (0.00015 in.) and width $W_1$ on the order of 7.6 μm (0.00030 in.). Defect 28 has the potential to evolve into a crack during service, which can trigger replacement of the entire part.

In contrast, surface roughness 32 is a high frequency, nano-level feature with depth $D_3$ and width $W_3$ being an order of magnitude smaller than defect 28. Also in contrast, deviation 34 is a macro-level feature with depth $D_2$ and width $W_2$ that indicates a general straying from the nominal shape that workpiece 12 should have. More specifically, a deviation 34 has a ratio of $D_2/W_2$ that is approximately ten times smaller than the ratio of $D_1/W_1$ that a defect 28 would have. Accordingly, deviation 34 is at least one order of magnitude larger than defect 28. While surface roughness 32 and deviation 34 may cause issues on their own, they are not typically involved with the type of crack formation that defect 28 is.

Given the general size of defect 28, tip 26 is configured to have a resolution of 2.5 µm (0.00010 in.) or smaller in depth and 5.1 µm (0.00020 in.) or smaller in width. Therefore, the components and configuration of defect detection system 10 allow for the workpiece 12 to be analyzed at a micro-level because defect detection system 10 can locate and measure micro-level features like defect 28.

Figure 3:
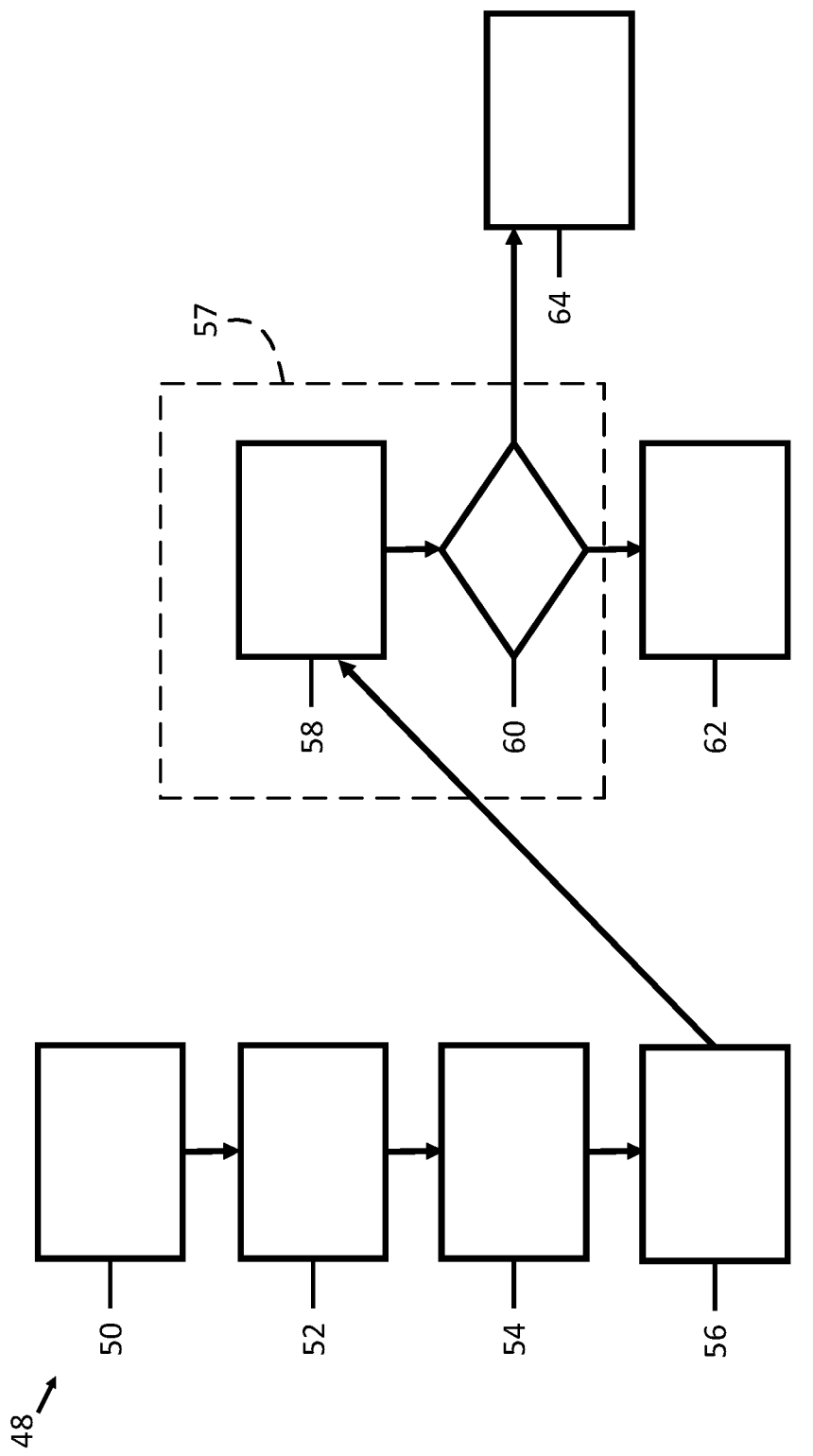
FIG. 3 is a flowchart of a method of inspecting the workpiece for defects.

FIG. 3 is a flowchart of method 48 of inspecting workpiece 12 for defects 28 (shown in FIG. 2). At step 50, workpiece 12 is positioned to align a first dovetail slot 14 with defect detection system 10. At step 52, defect detection system 10 passes tip around pathway 30 to measure workpiece 12 at 20% height of dovetail slot 14, recording data points at intervals I. At step 54, defect detection system 10 passes tip around pathway 30 to measure workpiece 12 at 50% height of dovetail slot 14, recording data points at intervals I that represent the local distance and orientation of workpiece 12 with respect to pathway 30. At step 56, defect detection system 10 passes tip around pathway 30 to measure workpiece 12 at 80% height of dovetail slot 14, recording data points at intervals I.

After step 56, method 48 moves to a sub-method 57 of evaluation. Sub-method 57 includes steps 58 and 60 and will be discussed in greater detail with respect to FIG. 4. At step 58, the data points are analyzed. At step 60, a binary decision is made as to whether the first dovetail slot 14 is acceptable by comparing defect 28 against predetermined size criteria threshold. For example, if defect 28 has a depth $D_1$ greater than or equal to 3.8 µm (0.00015 in.) and/or a width $W_1$ greater than or equal to 7.6 µm (0.00030 in.), then the first dovetail slot 14 is not acceptable. In that situation, then method 48 is halted and workpiece 12 can be scrapped at step 62. If the first dovetail slot 14 is acceptable (i.e., there are no defects 28 or any defect 28 that is present is sufficiently small), then workpiece 12 is repositioned to align a second dovetail slot 14 with defect detection system 10 at step 64. From there, method 48 is continued and steps 52-60 and 64 are repeated until all of the dovetail slots 14 are measured, analyzed, and deemed acceptable.

Figure 4:
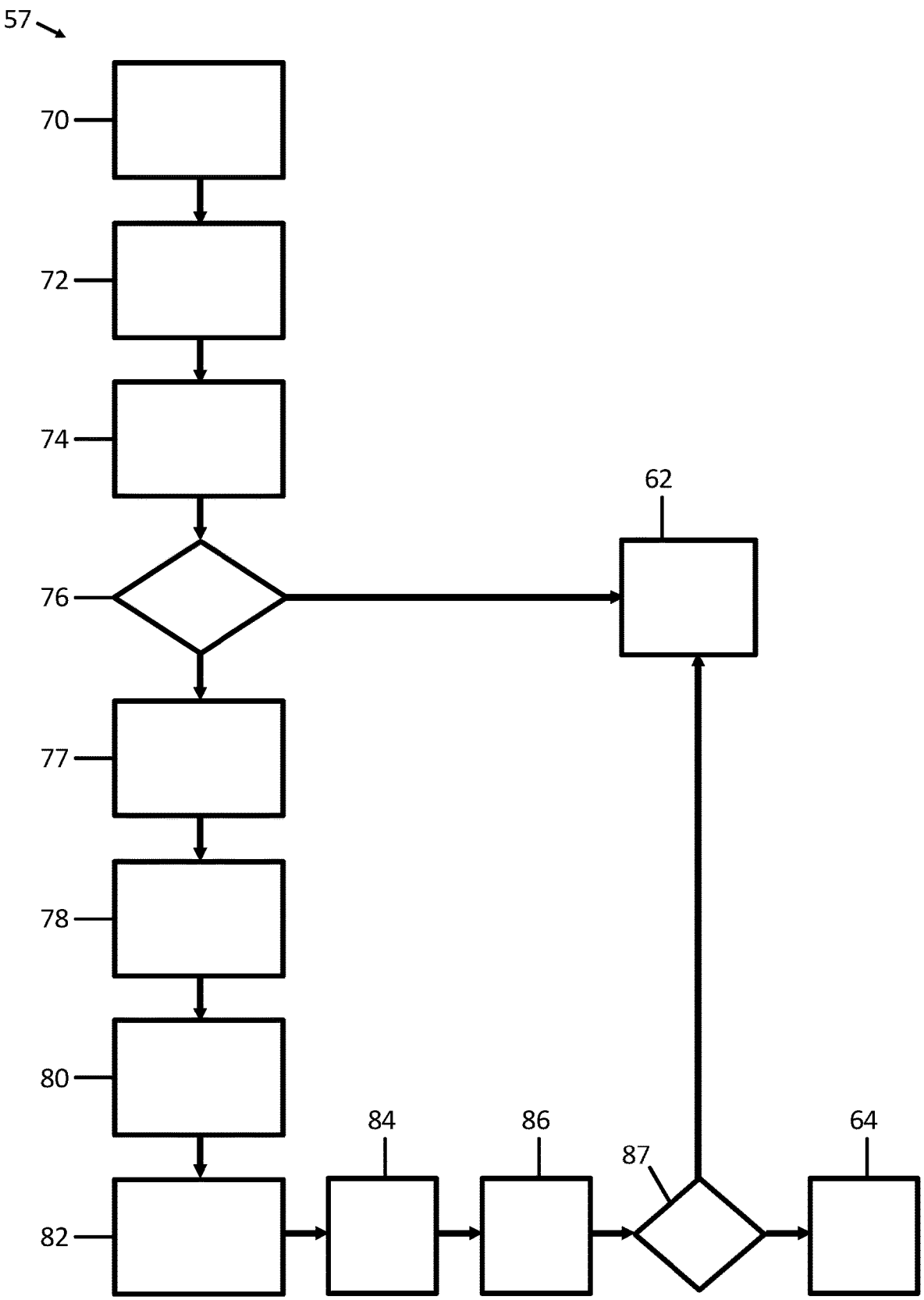
FIG. 4 is a flowchart of a sub-method of detecting, measuring, and evaluating any defects that may be present.

FIG. 4 is a flowchart of sub-method 57 of detecting, measuring, and evaluating any defects 28 that may be present in workpiece 12. In the illustrated embodiment, at step 70, a raw curve is constructed by listing all of the data points from the three passes together. At step 72, a short meanline curve is constructed by generating a moving average of, for example, 10-20 adjacent data points. At step 74, a filtered curve is constructed by finding the difference between the short meanline curve and the raw curve. Thereby, step 74 is a high-pass filter that eliminates the low-frequency deviations 34 from the analysis of workpiece 12 but leaves the medium-frequency defects 28 (if there are any) and the high-frequency surface roughness 32. At step 76, the minimum value and the maximum values of the filtered curve are found and are evaluated. In one embodiment, the difference between the maximum and the minimum values is calculated and compared to a threshold value. If the difference exceeds the threshold value, then the first dovetail slot 14 is unacceptable, and step 62 of method 48 can be executed. If the difference is smaller than the threshold value, then the first dovetail slot 14 is acceptable, and step 64 of method 48 can be executed. In an alternate embodiment, the maximum and minimum values are calculated and separately compared to a maximum and a minimum threshold value, respectively.

At step 77, if it would be advantageous, a cleaned meanline curve is constructed by running the short meanline curve through a low-pass filter. Thereby, step 77 eliminates any remaining high-frequency surface roughness 32 from the analysis of workpiece 12 but leaves the medium-frequency defects 28 (if there are any). At step 78, the second derivative of the cleaned meanline curve is computed in order to construct a reversal curve. At step 80, the reversal curve is analyzed to find "reversals" which are locations where the reversal curve crosses "0" (i.e., where the sign changes between positive and negative). These locations represent reversals of the radius of curvature from one side of the surface to the other. At step 82, the distances between pairs of adjacent reversals are calculated. These distances represent the size of width $W_1$ of each defect 28.

At step 84, a long meanline curve is constructed by generating a moving average of, for example, 100-200 adjacent data points. At step 86, a depth curve is constructed by subtracting the long meanline curve from the first curve (of step 70), wherein the depth curve represents the depth $D_1$ of each defect 28. At step 87, the calculated width $W_1$ and depth $D_1$ are compared to threshold values. If at least one of the values are too large, then then the first dovetail slot 14 is unacceptable, and step 62 of method 48 can be executed. If both values are sufficiently small, then the first dovetail slot 14 is acceptable, and step 64 of method 48 can be executed. Employing sub-method 57 can provide an analysis of micro-level features without interference from macro-level or nano-level features.

Figure 5:
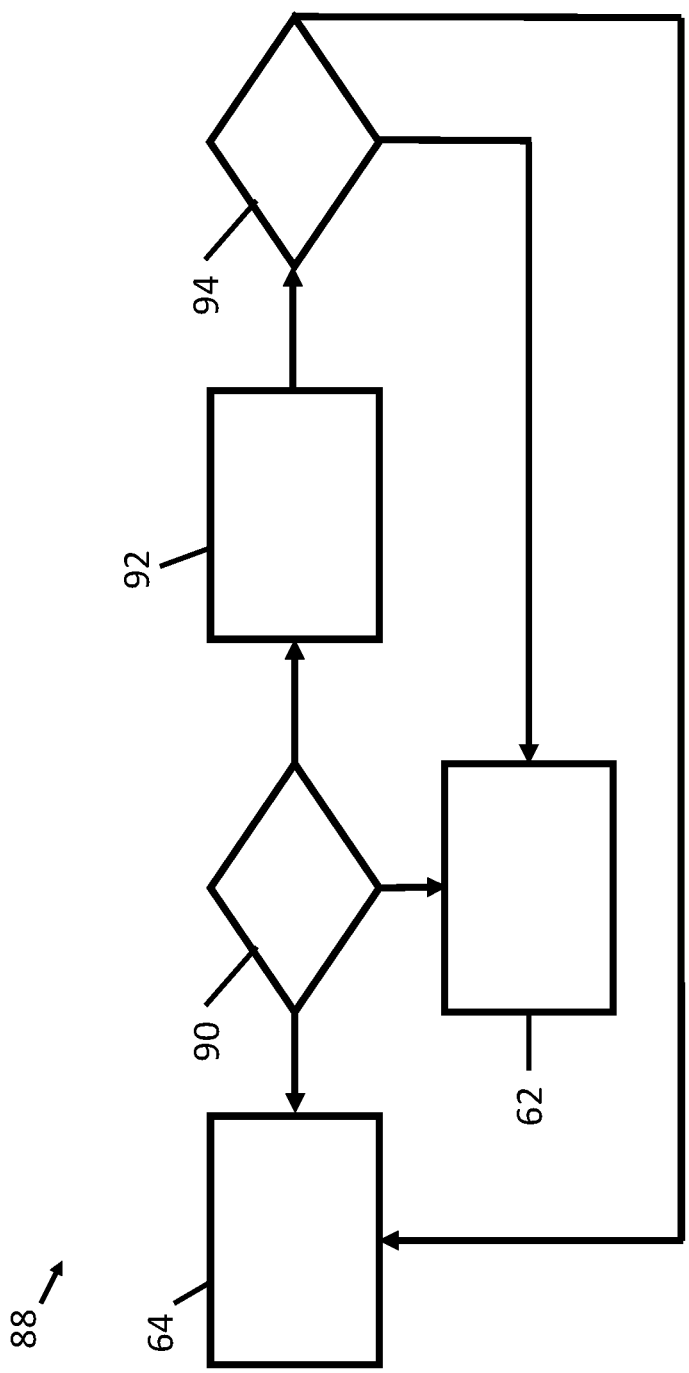
FIG. 5 is a flowchart of an alternate embodiment sub-method of evaluating any defects that may be present.

FIG. 5 is a flowchart of an alternate embodiment sub-method 88 of evaluating any defects 28 that may be present in workpiece 12. This method can be employed, for example, in step 87 of sub-method 57 to determine whether the first dovetail slot 14 is acceptable.

In the illustrated embodiment, at step 90, a ternary decision is made as to the acceptability of the first dovetail slot 14. In such an embodiment, the three answers are "acceptable", "unacceptable", and "investigate further". If the answer is "unacceptable", then the next step would be step 62 of method 48, but if the answer is "acceptable", then the next step would be either step 78 of sub-method 57 or step 64 of method 48. Alternatively, for example, if defect 28 has a depth $D_1$ between 2.5 µm (0.00010 in.) and 5.1 µm (0.00020 in.) and/or a width $W_1$ between 5.1 µm (0.00020 in.) and 6.4 µm (0.00025 in.) and 8.9 µm (0.00035 in.), dovetail slot 14 would require further investigation. If defect 28 were smaller than these ranges, then the first dovetail slot 14 would be acceptable, and step 64 of method 48 would be next. But if defect 28 were larger than these ranges, then the first dovetail slot 14 would be unacceptable, and step 62 of method 48 would be next. In an alternate embodiment, sub-method 88 can be employed in step 76 of sub-method 57. In such an embodiment, if the first dovetail slot 44 were acceptable, then step 78 would be next.

Given a result of "investigate further" at step 90, at step 92, tip 26 is returned only to the area to be investigated in order to measure the defect 28 in question again. To complete the investigation, defect detection system 10 can alter its parameters from the initial pass, for example, by decreasing interval I at which data is collected, by traveling in the reverse direction from the initial pass and/or by changing another parameter that can decrease the hysteresis in tip 26 (e.g., changing the force on tip 26 or changing the spectrum of light gathered by tip 26). Once a more accurate remeasurement of defect 28 is obtained, defect 28 can be judged in a binary decision at step 94 to determine the acceptability of dovetail slot 14. For example, if defect 28 has a depth $D_1$ greater than or equal to 3.8 µm (0.00015 in.) and/or a width $W_1$ greater than or equal to 7.6 µm (0.00030 in.), then dovetail slot 14 is not acceptable. In addition, alternative forms of data analysis can be performed during sub-method 88, for example, Fourier analysis. Employing sub-method 88 can provide a rapid initial pass that saves time while providing greater measurement accuracy for any areas that are questionable.

Discussion of Possible Embodiments

The following are non-exclusive descriptions of possible embodiments of the present invention.

A method of evaluating an article, according to an exemplary embodiment of this disclosure, among other possible things includes: measuring a first feature of the article using a defect detection device; recording a set of data points representing the first feature; analyzing the set of data points, the analyzing comprising: constructing a filtered curve by constructing a raw curve by listing the set of data points, constructing a first meanline curve, and finding a first difference between the raw curve and the first meanline curve; constructing a reversal curve by calculating a second derivative of a meanline curve constructed from the set of data points; and deciding an acceptability of the first feature of the article.

The method of the preceding paragraph can optionally include, additionally and/or alternatively, any one or more of the following steps, features, configurations and/or additional components:

A further embodiment of the foregoing method, wherein constructing the reversal curve comprises: constructing the first meanline curve by generating a moving average of at least 10 data points.

A further embodiment of any of the foregoing methods, wherein constructing the filtered curve eliminates deviations of the article from a design of the article from the step of analyzing of the set of data points.

A further embodiment of any of the foregoing methods, wherein constructing the reversal curve further comprises: calculating a maximum value and a minimum value from the filtered curve.

A further embodiment of any of the foregoing methods, wherein deciding the acceptability of the first feature comprises: finding a maximum value of the filtered curve; and finding a minimum value of the filtered curve.

A further embodiment of any of the foregoing methods, wherein deciding the acceptability of the first feature further comprises: calculating a second difference between the maximum value and the minimum value of the filtered curve.

A further embodiment of any of the foregoing methods, wherein constructing the reversal curve further comprises: computing the second derivative of the first meanline curve.

A further embodiment of any of the foregoing methods, wherein analyzing the set of data points comprises: analyzing the reversal curve to find reversals of a radius of curvature of a surface of the article.

A further embodiment of any of the foregoing methods, wherein analyzing the set of data points comprises: calculating a distance between a pair of adjacent reversals; and comparing the distance to a predetermined criteria threshold.

A further embodiment of any of the foregoing methods, wherein measuring the first feature comprises: passing the probe across a first region of the first feature; passing the probe across a second region of the first feature; and passing the probe across a third region of the first feature.

A further embodiment of any of the foregoing methods, wherein constructing a reversal curve comprises: constructing a second meanline curve by generating a moving average of at least 100 data points; and finding a difference between the second meanline curve and the raw curve to construct a depth curve.

A further embodiment of any of the foregoing methods, wherein the method further comprises: aligning the defect detection device with the first feature prior to measuring the first feature; and aligning the defect detection device with a second feature after the first feature has been decided to be acceptable.

A further embodiment of any of the foregoing methods, wherein the method further comprises: halting measuring the article after the first feature has been decided to be unacceptable.

A further embodiment of any of the foregoing methods, wherein deciding an acceptability of the first feature of the article requires additional investigation, the method further comprising: remeasuring an area of the first feature using a different set of measurement parameters; recording another set of data points representing the first feature; analyzing the another set of data points; and deciding whether the first feature of the article is acceptable or unacceptable.

A further embodiment of any of the foregoing methods, wherein the different set of measurement parameters used in remeasuring are different than the step of measuring in that: an interval between data points in decreased; a direction is reversed; a force of the defect detection device is different; or a light of the defect detection device is different.

A further embodiment of any of the foregoing methods, wherein the defect detection device measures the first feature of the article by contacting the article.

A further embodiment of any of the foregoing methods, wherein the defect detection device contacts the article by a stylus or a plurality of photons.

A method of measuring a defect in a rotor disk, according to an exemplary embodiment of this disclosure, among other possible things includes: passing a probe around a dovetail slot of the rotor disk; analyzing a set of data points gathered by the passing of the probe, the analyzing comprising: constructing a filtered curve by constructing a raw curve by listing the set of data points, constructing a meanline curve, and finding the difference between the raw curve and the meanline curve to calculate a filtered curve; and constructing a reversal curve by calculating a second derivative of a meanline curve; and deciding whether the dovetail slot is acceptable or unacceptable.

The method of the preceding paragraph can optionally include, additionally and/or alternatively, any one or more of the following steps, features, configurations and/or additional components:

A further embodiment of the foregoing method, wherein the probe comprises a stylus, an optical system, or a laser system.

A further embodiment of any of the foregoing methods, wherein analyzing the set of data points further comprises: calculating a maximum value and a minimum value from the filtered curve.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of evaluating an article, the method comprising:
    measuring a first feature of the article using a defect detection device;
    recording a set of data points representing the first feature;
    analyzing the set of data points, the analyzing comprising:
        constructing a filtered curve by constructing a raw curve by listing the set of data points, constructing a first meanline curve, and finding a first difference between the raw curve and the first meanline curve;
        constructing a reversal curve by calculating a second derivative of the first meanline curve constructed from the set of data points;
        analyzing the reversal curve to find reversals of a radius of curvature of a surface of the article; and
    deciding an acceptability of the first feature of the article by comparing the filtered curve to a first threshold value or by comparing a distance between pairs of adjacent reversals determined from the reversal curve to a second threshold value.

2. The method of claim 1, wherein constructing the reversal curve comprises:
    constructing the first meanline curve by generating a moving average of at least 10 data points.

3. The method of claim 1, wherein constructing the filtered curve eliminates deviations of the article from a design of the article from the step of analyzing of the set of data points.

4. The method of claim 1, wherein constructing the reversal filtered curve further comprises:
    calculating a maximum value and a minimum value from the filtered curve.

5. The method of claim 4, wherein deciding the acceptability of the first feature comprises:
    finding a maximum value of the filtered curve; and
    finding a minimum value of the filtered curve.

6. The method of claim 5, wherein deciding the acceptability of the first feature further comprises:
    calculating a second difference between the maximum value and the minimum value of the filtered curve.

7. The method of claim 5, wherein constructing the reversal curve further comprises:
    computing the second derivative of the first meanline curve.

8. The method of claim 1, wherein analyzing the set of data points comprises:
    calculating a distance between a pair of adjacent reversals; and
    comparing the distance to a predetermined criteria threshold.

9. The method of claim 1, wherein measuring the first feature comprises:
    passing the probe across a first region of the first feature;
    passing the probe across a second region of the first feature; and
    passing the probe across a third region of the first feature.

10. The method of claim 1, wherein constructing a reversal curve comprises:
    constructing a second meanline curve by generating a moving average of at least 100 data points; and
    finding a difference between the second meanline curve and the raw curve to construct a depth curve.

11. The method of claim 1, further comprising:
    aligning the defect detection device with the first feature prior to measuring the first feature; and
    aligning the defect detection device with a second feature after the first feature has been decided to be acceptable.

12. The method of claim 1, further comprising:
    halting measuring the article after the first feature has been decided to be unacceptable.

13. The method of claim 1, wherein deciding an acceptability of the first feature of the article requires additional investigation, the method further comprising:
    remeasuring an area of the first feature using a different set of measurement parameters;
    recording another set of data points representing the first feature;
    analyzing the another set of data points; and
    deciding whether the first feature of the article is acceptable or unacceptable.

14. The method of claim 13, wherein the different set of measurement parameters used in remeasuring are different than the step of measuring in that:
    an interval between data points in decreased;
    a direction is reversed;
    a force of the defect detection device is different; or
    a light of the defect detection device is different.

15. The method of claim 1, wherein the defect detection device measures the first feature of the article by contacting the article with a stylus.

16. The method of claim 1, wherein the defect detection device measures the first feature of the article by using a plurality of photons.

17. A method of measuring a defect in a rotor disk, the method comprising:
    passing a probe around a dovetail slot of the rotor disk;
    analyzing a set of data points gathered by the passing of the probe, the analyzing comprising:
        constructing a filtered curve by constructing a raw curve by listing the set of data points, constructing a meanline curve, and finding the difference between the raw curve and the meanline curve to calculate a filtered curve; and
        constructing a reversal curve by calculating a second derivative of the meanline curve;
        analyzing the reversal curve to find reversals of a radius of curvature of a surface of the article; and
    deciding whether the dovetail slot is acceptable or unacceptable by comparing the filtered curve to a first threshold value or by comparing a distance between pairs of adjacent reversals determined from the reversal curve to a second threshold value.

18. The method of claim 17, wherein the probe comprises a stylus, an optical system, or a laser system.

19. The method of claim 17, wherein analyzing the set of data points further comprises:
calculating a maximum value and a minimum value from the filtered curve.

\* \* \* \* \*